Figure 1:
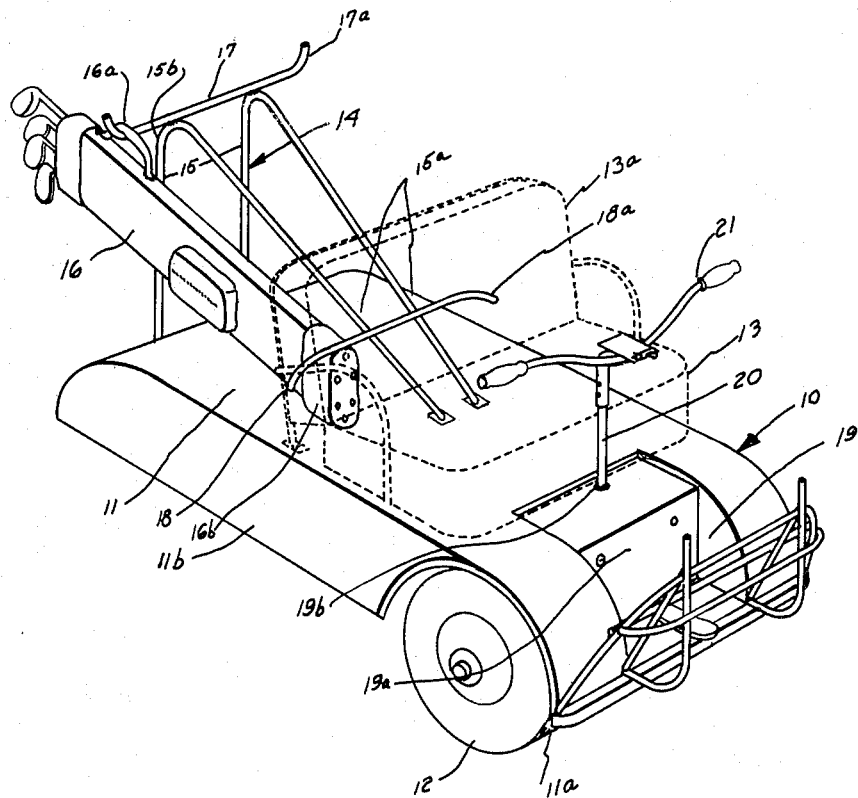

Nov. 1, 1960 V. G. BRUNDERMAN 2,958,386
MOTORIZED GOLF VEHICLE
Filed May 15, 1957 3 Sheets-Sheet 1

INVENTOR:
Vincent G. Brunderman,
BY
Jerome F. Fallon
ATTORNEY.

Nov. 1, 1960  V. G. BRUNDERMAN  2,958,386
MOTORIZED GOLF VEHICLE
Filed May 15, 1957  3 Sheets-Sheet 2

INVENTOR:
Vincent G. Brunderman,
BY
Jerome F. Fallon
ATTORNEY.

Nov. 1, 1960 V. G. BRUNDERMAN 2,958,386
MOTORIZED GOLF VEHICLE
Filed May 15, 1957 3 Sheets—Sheet 3
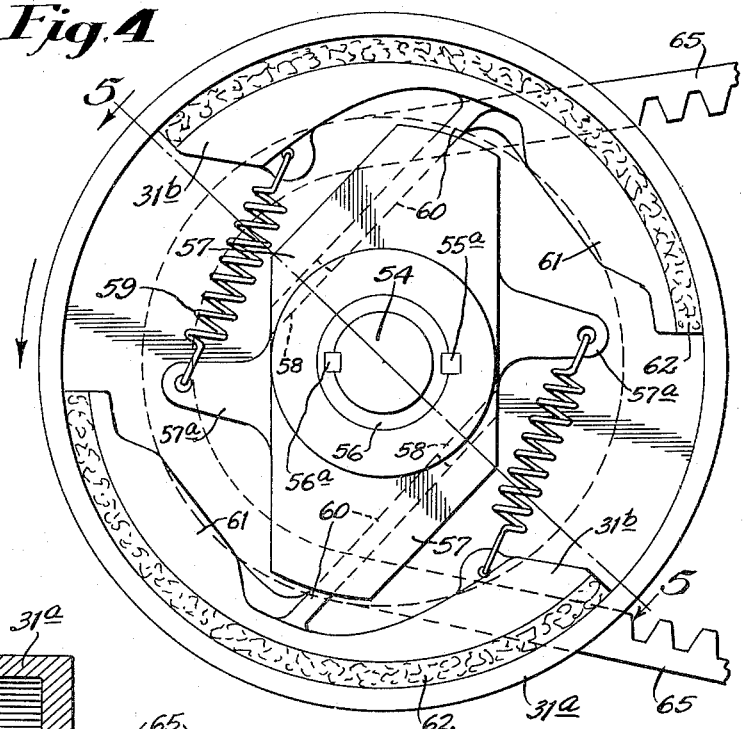
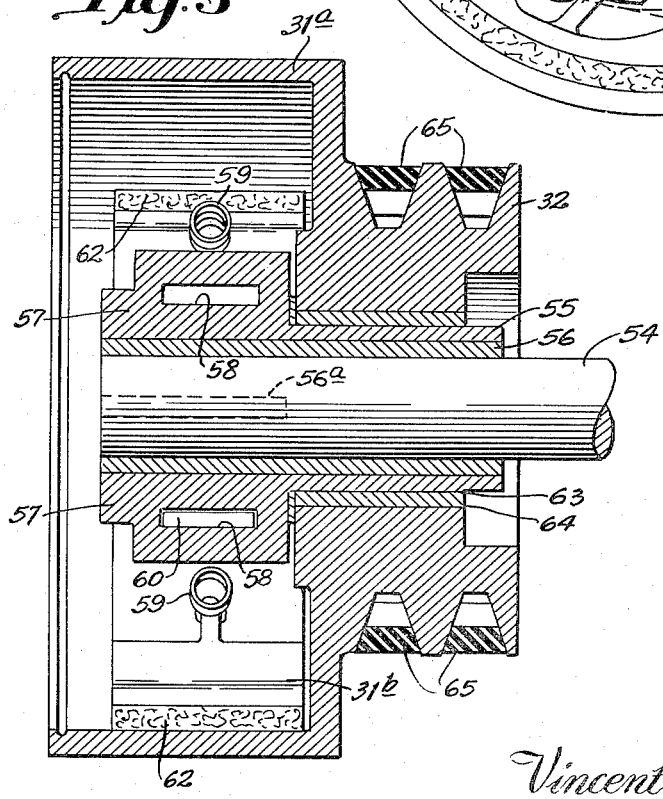
INVENTOR:
Vincent G. Brunderman,
BY
Jerome F. Fallon,
ATTORNEY.

United States Patent Office 2,958,386
Patented Nov. 1, 1960

2,958,386

MOTORIZED GOLF VEHICLE

Vincent G. Brunderman, Chicago, Ill., assignor to Jetgo Manufacturing Company, Chicago, Ill., a partnership Filed May 15, 1957, Ser. No. 659,235

4 Claims. (Cl. 180—65)

This invention relates to a motorized golf vehicle and, more particularly, to a vehicle for transporting golfers and their equipment around a golf course.

This application is a continuation-in-part of my copending application Serial No. 559,553, filed January 17, 1956, now Patent No. 2,844,209.

A significant disadvantage in the vehicles currently available for transporting golfers is their shortness of range. For example, the electrically powered vehicles now available are generally limited in range to about the distance required in traversing 27 holes on an ordinary golf course. Electrically powered vehicles have been preferred because of their quietness and cleanliness of operation. The shortness of range characteristic of the heretofore available golf vehicles is disadvantageous to both golfer and the owner of the vehicle. Should the golfer utilizing the vehicle have a weak heart, it might be disastrous if his vehicle stalled on the golf course a considerable distance from the clubhouse. The problem of short range also affects the owner of the cart who must expend more time and money in recharging the batteries ordinarily used as a source of electrical power. This requires more "down-time" of the vehicle which therefore lessens its usefulness to the owner.

The problem outlined above is not generally avoided by the use of more batteries since the inclusion of more batteries in the vehicle introduces more weight and therefore utilizes more power. At the same time, the cart becomes more bulky since its size must be increased to accommodate the additional batteries.

It is a general object of this invention to provide a vehicle which avoids the problems and disadvantages of the vehicles heretofore available. Another object is to provide a golf vehicle that employs a novel power system for propulsion. Yet another object is to provide a vehicle powered by a battery system which heretofore thought limited to a range of about 27 holes but which now has an effective range up to about 72 holes without battery recharging. Still another object is to provide a golf vehicle powered by electricity wherein the danger of burning up of the various electrical components upon vehicle stalling is substantially minimized. Still another object is to provide a golf vehicle that is characterized by novel and efficient operation, particularly at low speeds. A still further object is to provide a golf vehicle that automatically "rocks" itself when the wheels thereof are stuck to substantially aid in extraction of the vehicle. Another object is to provide a vehicle for golfers which employs a novel power system, including a source of direct current, a direct current motor having a series winding, and clutch means for transmission of rotative power from the motor. Yet another object is to provide a novel type of power system which includes a centrifugal clutch particularly adapted for use in the power system when applied to golf vehicles. Other objects and advantages of my invention will be seen as this specification proceeds.

In the practice of my invention, I connect a source of direct current power, such as storage batteries, directly with a direct current motor having a series winding, interposing in the electrical connection therebetween only a high current capacity, low resistance switch. I employ a centrifugal clutch operatively associated with the output side of the direct current motor wherein the clutch is so constructed as to transmit power from the motor when the speed of the motor is only a minor fraction of its rated speed under full load. The clutch is also so constructed so that it engages at a higher speed than the speed at which it disengages. The output of the motor clutch unit is transmitted to a rear wheel unit which is powered directly without the interposition of any differential.

The invention is shown, in illustrative embodiments, by the accompanying drawing in which—

Figure 2:
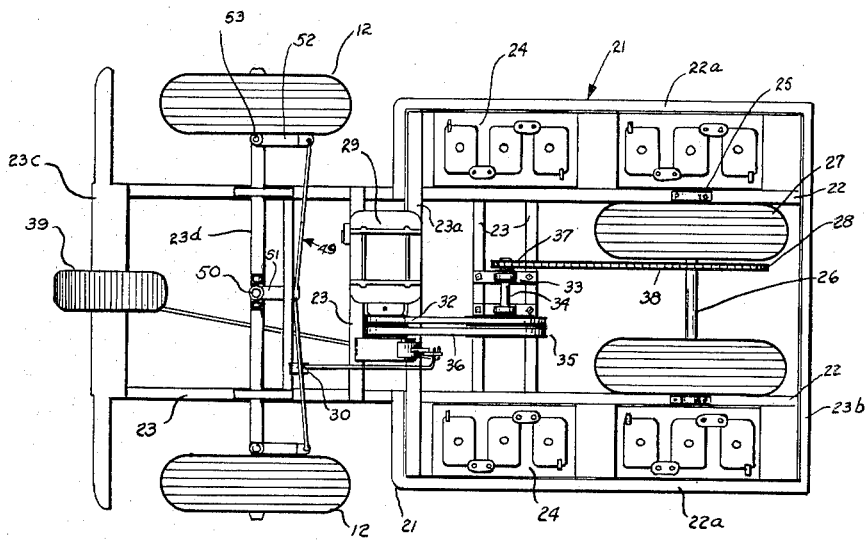
Figure 3:
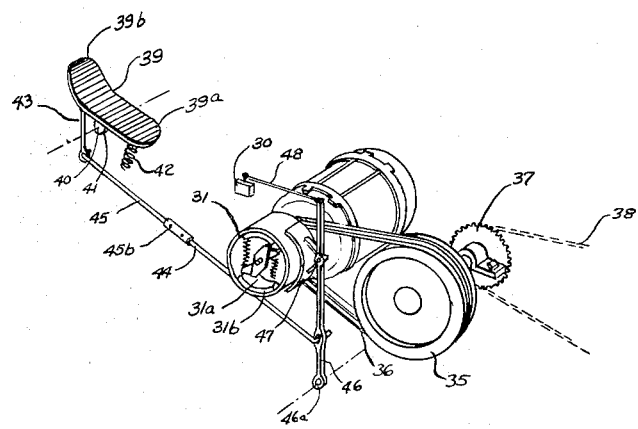

Fig. 1 is a perspective view of the vehicle of my invention; Fig. 2 is a top plan view of my vehicle with the body removed so as to show particularly the power transmission mechanism; Fig. 3 is a fragmentary perspective view of the transmission mechanism; Fig. 4 is an end view of the clutch means portion of the transmission mechanism of my golfing vehicle, with an end plate removed so as to depict a portion of the working parts of the clutch; and Fig. 5 is a cross-sectional view taken along the line 5—5 of Fig. 4.

Referring now to the drawing, and Fig. 1 in particular, the numeral 10 denotes generally a golfing vehicle constructed according to my invention. In the illustration given, vehicle 10 includes a body portion 11 mounted on and hinged to a frame 21 (not shown in Fig. 1, but which can be seen in Fig. 2). Also mounted on the frame and supporting the frame from the ground are four wheels, only one of which is seen in Fig. 1 and is designated 12. Mounted on the top side of body 11 is seat 13, depicted in dotted lines so as to permit observation of a bag rack, generally designated 14, which is also mounted on the top side of body 11, but rearward of seat 13.

The portion of frame 21 supporting that portion of body 11 on which seat 13 and bag rack 14 are mounted, is rectangular in outline, the rear transverse member providing a base to which the rear side of body 11 is hinged.

Bag rack 14 is constructed of ⅞ inch welded tubing and includes four structural members including main vertical members 15 and cross members 17 and 18. Main vertical members 15 of bag rack 14 are bent on themselves approximately 330° to form a pair of knee braces. The ends of the knee braces thus formed are secured to body 11, the ends of the angled limbs 15a being spaced somewhat closer together than the ends of the vertical limbs 15. The ends of angled limbs 15a are anchored to body 11. Welded to the top surface of vertical members 15 are cross bars 17 and 18, positioned at knee or bend of vertical members 15 and near the ends of angled limbs 15a, respectively. Golf bag 16 is shown suspended on bag rack 14 by its handle 16a, the end 16b of golf bag 16 bearing against the underside of cross member 18. Alternatively it is possible to support golf bag 16 by so positioning it that cross member 17 is under bag 16 rather than extending through handle 16a. Since the main weight of golf bag 16, when carrying clubs, is near the top, cross member 17 acts as a fulcrum so that the above described action of bag 16 in bearing against cross member 18 is achieved. Cross member 17 is curved upwardly as at 17a and cross member 18 is curved downwardly as at 18a to prevent inadvertent dislodgment of bag 16. Bag 16 is also maintained against sliding inwardly by knee brace 15 which is extended a slight distance rearward of cross bar 17.

Thus, I have provided a bag rack permitting ready and secure mounting of golf bags without the need to resort to straps.

Body 11 is generally of a rectangular nature, having its top portion curved downwardly at its front and rear extremities to form mud guards or fenders, as designated 11a. The sides are enclosed by vertical plates 11b. A rectangular central portion 19 is struck from the downwardly curved front wall 11a to provide comfortable leg area for the driver of vehicle 10. Z-shaped plate 19a is independently secured to the frame, thus permitting body 11 to be pivoted upwardly and rearwardly about its rear hinges to provide convenient access to the power and transmission system mounted beneath body 11.

Extending upwardly through top leg 19b of Z-shaped plate 19a is steering column 20. Steering column 20 is equipped at its unsecured end with a laterally extending handle bar 21 which permits unobstructed raising of body 11.

Turning now to Figure 2 which shows the top plan view of vehicle 10, but with body 11 and plate 19a removed, the figure 21 generally designates a metal frame which primarily includes a pair of parallel longitudinal members 22 held in spaced relation by a number of cross members 23 constructed of 1¼ inch square tubing. One of the intermediate cross members 23a and the rear cross member 23b are extended outwardly of members 22 and connected together at their ends by supplemental longitudinal members 22a, thereby forming convenient mounting areas for storage batteries 24, four of which are used to power my vehicle. The peripheral members 22a and 23b are constructed of one inch by one inch by one-eighth inch angles which permit ready and rigid mounting of body 11. As pointed out above, body 11 is hinged to rear cross member 23b.

Members 22 also carry mounting surfaces for bearings 25 and which carry rear axle 26. Key seated, welded or otherwise non-rotatingly secured to rear axle 26 and between members 22, are rear wheels 27 and driven sprocket 28.

Mounted on crossbars 23 and 23a is a direct current electric motor 29. Satisfactory results are obtained when electric motor 29 contains a series winding, and optimal results are obtained when motor 29 is a series wound direct current motor. In this connection, it is to be noted that a motor having a high torque is preferred. Motor 29 is powered by four six volt storage batteries 24 which are connected to motor 29 by heavy conductors (not shown), having interposed toggle switch 30. Not shown but connectible in the heavy conductors transmitting electrical power from batteries 24 to motor 29, is a reversing switch. The reversing switch conveniently can take the form similar to toggle switch 30. Wiring between batteries 24 and motor 29 is carried by a terminal plate on the underside of plate 19a while the reversing switch may be conveniently mounted on the front or top side thereof.

On its extended shaft, motor 29 carries a centrifugal clutch 31 which can be seen more clearly by a reference to Figs. 3–5. Generally, clutch 31 includes a housing 31a which is rotatably mounted on the shaft of motor 29, while the clutch elements or shoes 31b are fixed to the motor shaft. Mounted on housing 31a of clutch 31 on the motor side thereof is sheave 32. Mounted on a pair of intermediate cross members 23 are a pair of bearings 33 which carry shaft 34. On one extension of shaft 34 is carriage sheave 35 which is rotatably associated with sheave 32, and therefore clutch 31, by belts 36.

Sheave 32 has a pitch diameter of about three and one-half inches while sheave 35 has an eight inch diameter, yielding a speed reduction of about 2.3. Carried on the opposite extension of shaft 34, also outboard of bearing 33, is driving sprocket 37. Driving sprocket 37 provides rotational motion to driven sprocket 28 by means of roller chain 38. Driving sprocket 37 has a diameter of about 2½ inches while driven sprocket 28 has a pitch diameter of about thirteen inches, resulting in a speed reduction of 5.2 over an overall speed reduction of about 12. Thus, with a one and one-quarter horsepower motor having a speed of about 2100 r.p.m., maximum wheel speed is 175 r.p.m. I provide either 6.00 x 6 or 5.50 x 8 tires which have a diameter of 18 inches or a circumference of about 4.7 feet. This yields a maximum speed of about 10 miles per hour. Slightly higher speeds can be achieved by using a higher r.p.m. motor.

With speeds of this order I have found that I can eliminate a differential gear from the rear axle 26 but still effectively prevent undue ripping up of sod by spacing rear wheels 27 fairly close together, at a spacing of about 12 inches, center to center of the tires on rear wheels 27. On the other hand, it is necessary that rear wheels 27 be spaced apart from each other the distance indicated to provide stability for vehicle 10 necessary during turning or for traveling the rolling terrain encountered on a golf course, especially during the unbalanced occasion when one front wheel is lower than the other, as might be the case on uneven terrain.

Referring now specifically to Figure 3 which shows schematically the starting and brake system employed on vehicle 10, the numeral 39 indicates a foot pedal which is pivotally fulcrumed on forward cross member 23c of frame 21, as at 40 by means of depending lug 41. Cross member 23c is indicated schematically by a broken line in Figure 3 to show this relation. Urging foot pedal 39 in a clockwise manner is compression spring 42, secured at one end to the underside of pedal 39 rearward of lug 41 and at the other end to cross member 23c. Although the exact manner of securement is not shown, it is believed that this is unnecessary for those skilled in the art can readily provide such securement. Depending from the underside of pedal 39 forward of lug 41 is rod 43 which is part of the linkage generally designated 44, serving to convey pedal motion to toggle switch 30.

Linkage 44 includes connecting rod 45, which at one end is pivotally connected to the unsecured end of pedal rod 43, and which, at its other end, is pivotally connected to brake rod 46. Linkage adjustment 45b is provided in connecting rod 45. Brake rod 46 is pivotally mounted on frame 21 on cross member 23a at 46a, also designated schematically. Pivotally mounted on brake rod 46 is brake shoe 47 and starter rod 48.

Contributing to the easy handling of vehicle 10 is a lightweight steering system 49, as seen in Figure 2, operated by steering column 20, shown in Figure 1. Vertical stub shaft 50, to which steering column 20 is connected as an extension, is rotatably mounted on cross bar 23d. Fixed to stub shaft 50 and extending rearwardly is arm 51. Pivotally secured to the unsecured end of arm 51 are tie rods which are in turn pivotally secured at their other ends to wheel arms 52. Wheel arms 52 engage L-shaped spindles 53, which in turn are centrally secured to front wheels 12.

An illustrated embodiment of clutch 31 is shown in greater detail in Figures 4 and 5 wherein the numeral 31a designates a clutch housing and the numeral 31b the clutch elements or shoes. Housing 31a to which sheave 32 is integrally united is rotatably mounted on motor shaft 54. Fixedly mounted on shaft 54 is clutch hub 55. If the bore of clutch hub 55 is greater than the outside diameter of shaft 54, as shown in Figures 4 and 5 intermediate sleeve 56 can be employed. Clutch hub 55, sleeve 56 and shaft 54 are united in immovable relation by means of keys 55a and 56a mounted between hub 55 and sleeve 56, and between sleeve 56 and shaft 54, respectively. Clutch hub 55 is provided with a pair of radially extending integral arm-like portions 57. Slidably mounted in slots 58 of portions 57 are clutch elements or shoes 31b. Urging shoes 31b to a retracted position within slots 58 are coiled springs 59 which are interconnected between shoes 31a and projections 57a on portions 57. Slots 58 carry a slide portion 60 of shoes 31b, and slots 58 are disposed at an angle to a radius extending from shaft 54. The angle defining the location of slots 58 and slide portions 60 can be termed an angle disposed backwardly of or lagging of rotation of shaft 54 and clutch housing 31a as can be appreciated from Figure 4 wherein an arrow designates the rotation of these elements.

Clutch shoes 31b have slide elements 60 inclined forwardly thereto when considered from the standpoint of the direction of rotation. Slide elements 60 are integrally secured to shoes 31b at about a point intermediate the ends of shoes 31b. The portion of shoe 31b rearward of slide element 60 is enlarged or weighted as designated by the numeral 61. Shoes 31b are provided on their arcuate surfaces with linings 62.

Clutch housing 31a is provided with a bore generally designated 63 into which is fitted a bearing sleeve 64 which is rotatably received upon clutch hub 55. In the embodiment shown, rotative power from shaft 54 is transmitted through clutch 31 and hence through sheave 32 to a resilient cog belt 65.

Operation

To start my vehicle, it is merely necessary to depress the toe portion of foot pedal 39 a matter of about one inch. The counter-clockwise motion of the pedal 39 (as viewed from the left of vehicle 10) causes pedal rod 43 to be translated downwardly and rearwardly. Through linkage 44, especially connecting rod 45, the motion is rearwardly applied to brake rod 46 causing it to be rotated clockwise about pivot point 46a. The consequent rearward motion of the unsecured end of brake rod 46 causes brake shoe 47 to be removed from the curved surface of clutch housing 31a. The same movement of brake rod 46 pulls starter rod 48 backwardly, moving toggle switch 30 to the "on" position and connecting the storage batteries 24 (four series-connected six volt 170 ampere-hours rating) to electric motor 29. As motor 29 begins to turn, the centrifugal elements 31b are thrown outwardly and engage the cylindrical housing 31a of clutch 31, setting the transmission system comprising sheaves 32 and 35 and sprockets 37 and 28 in operation, resulting in turning rear wheels 27. Depending on the position of a reversing switch, if present, wheels 27 propel vehicle 10 rearwardly or forwardly. Upon removing foot pressure from pedal 29, compression spring 42 urges the pedal clockwise, reversing the movement of the various parts of linkage 44 and applying brake shoe 47 to clutch 31 while at the same time shifting toggle switch 30 to the "Off" position. More rapide deceleration can be achieved by depressing the heel portion 39a of foot pedal 39, thereby reinforcing the pressure applied through linkage 44 and brake shoe 47 to clutch 31. To facilitate the normally applied accelerating pressure on the toe portion of pedal 29, I have curved that portion upwardly at the top. In order to prolong the useful life of my invention, I provide a toggle switch 30 having its contacts immersed in a non-conducting oil such as Stanolex Transformer Oil to substantially eliminate arcing with its consequent pitting of contacts and also the waste of electricity. Toggle switch 30 is mounted on frame 21 on one of the intermediate cross members 23 as seen in Figure 2. I have found a number of types of toggle switches satisfactory for this purpose provided they are equipped with the above identified type of oil. It is believed that those skilled in the art will perceive ways of utilizing this teaching in the practice of my invention without the need for specific delineation. By the use of a fluid containing switch and the transmission system outlined above, I am able to dispense with the solenoid switching system and resistor starting arrangement employed on many electric vehicles which cause substantial losses of power on starting and stopping with the attendant shortening of range because of battery power depletion.

Important new results in the operation of a golf vehicle are obtained through the use of a transmission system of the character described when the system is in condition to transmit power at a low fraction of the rated speed of the electric motor under load. For example, I prefer that clutch shoes 31b engage housing 31a at from about 1/8 to 1/4 rated speed of motor 29. Optimum results are achieved when this engagement takes place at about from 500 to 600 r.p.m. when motor 29 is rated at 2100 to 2400 r.p.m. For a vehicle of a maximum speed load of about 10 miles-per-hour, this means that start-up will occur slowly and comfortably. Also of equal importance is the fact that start-up will not endanger the turf of a golf course which might be the case if higher starting speeds were utilized.

By arranging clutching elements 31b as hereinbefore described, another new and desirable result is achieved. Release or disengagement of clutching elements 31b from housing 31b is achieved at a lower speed than engagement. Optimum results are achieved when the disengagement is within the range 100–300 r.p.m. for a motor rated speed of 2100–2400 r.p.m. This is especially desirable in a golf vehicle where occasionally it is necessary to traverse steep grades. In the vehicle described, the torque output of the transmission system increases as the speed is reduced so that greater pulling power is provided automatically when necessary. As a steep hill is climbed vehicle 10 slows down which then supplies greater power to the rear wheels to continue propelling it.

Through the use of the transmission system provided, I materially minimize the chance of "burn-out" of the electrical elements. This desirable result is believed to stem from the fact that the motor is automatically disconnected from the propulsion means whenever the propulsion means (herein the rear wheels) are stalled. Should this not take place, a surge of current would be sent through the electrical system with consequent damage to the connecting cables, switches and motor. However, in a system of the type described, the maximum current that is sent through the motor just prior to stalling is limited to well below the tolerable value since as stalling is approached, the load is disconnected from the motor by virtue of the operation of clutch 31. Clutch 31 being in a "connected" state, slows down the motor whenever the rear wheels become immobilized. As the motor slows down, the clutch elements become disengaged. At the same time another desirable result is provided in that if stalling is produced by the rear wheels being temporarily stuck as in sand, the continued depression of foot pedal 39 after disengagement of clutch elements 31b from clutch housing 31a once again causes engagement of these elements with the housing when the motor reaches engagement speed. Thus, a "kick" is provided the rear wheels which tends to dislodge them from sand. If the first "kick" so provided does not result in dislodgement of the rear wheels, the motor 29 will slow down under the stalled load and clutch 31 will again disengage, followed by re-engagement as outlined above. This produces automatically a "rocking" of vehicle 10 which further contributes to dislodgement from any stalling type of obstruction. At the same time, however, the importance of this system in protecting the electrical components against burn-out cannot be overlooked since burn-out of an electrical component not only results in loss of use of the vehicle but involves a laborious repair. I have found that users of such vehicles, upon stalling, generally continue to keep the accelerator pedal depressed which, in the absence, of an automatic cut-out, would result in supplying of intolerably high currents to the electrical system which are productive of burn-out. For example, in the vehicle described above, a 2400 r.p.m. motor with a maximum capacity of 600 amps., will be disengaged from its load whenever the amperage rating is about 350 amps., corresponding to a speed at which clutch 31 disengages.

While in the foregoing specification I have set forth specific structures in considerable detail for the purpose of illustrating embodiments of the invention, it will be understood that such structures and such details are but illustrative of the invention and that the same, and the details thereof, may be varied widely by those skilled in the art without departing from the spirit of my invention.

I claim:

1. For a motorized golf vehicle, a propulsion system comprising a plurality of storage batteries equipped with on-off switch means, a direct current motor having a series winding electrically coupled to said batteries and switch means, a centrifugal clutch mounted on the shaft of said direct current motor, said clutch transmitting power from said motor only when the speed of said motor is above a minor fraction of the rated speed thereof, brake means removably bearing against the housing of said centrifugal clutch and propulsion system actuator means comprising a foot pedal mechanically linked to said brake means and said switch means whereby depression of said foot pedal simultaneously disengages said brake means from the housing of said centrifugal clutch and actuates said switch means to "on" position.

2. A propulsion system according to claim 1 wherein said clutch is provided with an integral sheave and cog-belt means to transmit the rotational output of said sheave to wheel means.

3. For a motorized golf vehicle, a propulsion system comprising a high torque, direct current, variable speed motor having an output shaft, storage battery means electrically connected to said motor and equipped with "on-off" switch means, a centrifugal clutch mounted on said shaft and equipped with a housing, said housing transmitting power from said motor only when the speed of said motor is above a minor fraction of the motor rated speed, brake means releasably bearing against said housing, and a foot pedal mechanically linked to said brake means and said switch means whereby depression of said foot pedal simultaneously disengages said brake means from said housing and actuates said switch means to "on" position.

4. The structure of claim 3 in which said vehicle comprises a frame, an elongated foot pedal equipped with pivot means on the underside thereof mounted on said frame, said pivot means being positioned intermediate the length of said pedal, linkage means connected to said pedal adjacent one end thereof and operatively coupled to said brake means, and spring means connected to said pedal adjacent the other end thereof and coupled to said frame.

References Cited in the file of this patent

UNITED STATES PATENTS

| | | |
|---|---|---|
| 464,245 | Dewey | Dec. 1, 1891 |
| 903,762 | Paulson | Nov. 10, 1908 |
| 1,129,954 | Carr | Mar. 2, 1915 |
| 1,235,973 | Heid | Aug. 7, 1917 |
| 1,955,309 | Packer | Apr. 17, 1934 |
| 1,956,417 | Else | Apr. 24, 1934 |
| 2,718,952 | Thompson | Sept. 27, 1955 |
| 2,749,997 | Deslippe | June 12, 1956 |